United States Patent [19]
Noguchi

[11] Patent Number: 5,982,637
[45] Date of Patent: Nov. 9, 1999

[54] ELECTRIC APPARATUS MOUNTED ON VEHICLE

[75] Inventor: Yoshihiro Noguchi, Koganei, Japan

[73] Assignee: Kabushiki Kaisha Kenwood, Tokyo, Japan

[21] Appl. No.: 08/947,155

[22] Filed: Oct. 8, 1997

[30] Foreign Application Priority Data

Oct. 9, 1996 [JP] Japan .................................. 8-287531

[51] Int. Cl.⁶ .................................................. H04B 1/03
[52] U.S. Cl. .......................... 361/814; 361/600; 361/627; 361/679; 174/72 A; 174/72 TR; 307/10.1; 307/10.2; 455/90
[58] Field of Search .................................. 361/600, 608, 361/610, 627, 679, 725, 727, 814, 826, 827; 174/72 A; 307/10.1, 10.2; 439/501, 502, 297; 455/89, 90

[56] References Cited

U.S. PATENT DOCUMENTS

| | | | |
|---|---|---|---|
| 4,862,011 | 8/1989 | Wright | 361/827 |
| 5,468,159 | 11/1995 | Brodsky et al. | 439/501 |
| 5,510,957 | 4/1996 | Tagaki | 361/814 |
| 5,606,730 | 2/1997 | Rush et al. | 361/814 |

FOREIGN PATENT DOCUMENTS

| | | |
|---|---|---|
| 6-29947 | 4/1994 | Japan . |
| 6-60178 | 8/1994 | Japan . |
| 9-123842 | 5/1997 | Japan . |

*Primary Examiner*—Leo P. Picard
*Assistant Examiner*—Boris L. Chervinsky
*Attorney, Agent, or Firm*—Sixbey, Friedman, Leedom & Ferguson, PC; Eric J. Robinson

[57] ABSTRACT

Robbery of a vehicle-mount electric apparatus can be prevented by only driving an operation panel to turn it upside down. The operation panel is disposed in front of the main body of the vehicle-mount audio apparatus, and is moved while being rotated about its rotary shaft. The operation panel moves between first and second states. In the first state, the normally used surface of the operation panel is used as the front surface of the apparatus, and in the second state, the surface other than the normally used surface is used as the front surface. When the operation panel takes generally a horizontal state during the motion of the operation panel 5, the rotary shaft thereof is positioned at one end of the motion range of the operation panel. A drive mechanism chassis for supporting a mechanism for driving the operation panel is supported by horizontal guide grooves of a fixed chassis movably in the horizontal direction, and the horizontal motion of the rotary shaft of the operation panel is regulated by a horizontal guide groove of the fixed chassis.

10 Claims, 11 Drawing Sheets

ELECTRIC APPARATUS MOUNTED ON VEHICLE

BACKGROUND OF THE INVENTION

1. Field of the Invention

The present invention relates to a vehicle-mount electric apparatus in which an operation panel is mechanically driven, and more particularly to a vehicle-mount electric apparatus suitable for preventing robbery by hiding the vehicle-mount electric apparatus when a driver moves away from the vehicle.

2. Description of the Related Art

Apparatuses are known which can prevent robbery by hiding a vehicle-mount electric apparatus when a driver moves away from the vehicle. FIGS. 10A to 10C and FIGS. 11A to 11C show an example of a robbery preventing apparatus for use with a vehicle-mount electric apparatus disclosed in Japanese Patent Laid-open Publication HEI 6-339875 filed by the present applicant. In these Figures, reference numeral 104 represents a chassis for housing a vehicle-mount audio apparatus, the chassis being inserted in and fixed to a mount recess of the vehicle. An escutcheon 106 is fixed to the chassis 104 and rotatively supports a frame 107.

FIG. 10A shows a use state of the vehicle-mount audio apparatus in which an operation panel 108 is situated in the front area. Reference numeral 108a represents a cassette port formed in the operation panel 108. As an unrepresented activation switch of the robbery preventing apparatus is depressed in the state shown in FIG. 10A, the frame 107 rotates upward toward the horizontal position as shown in FIGS. 10B and 10C. In this state, a cover 105 first positioned in the upper inside of the chassis 104 moves toward the frame 107 along the groove formed in the frame 107. At the same time, the operation panel 108 is moved backward. FIG. 11A shows the state of the cover 105 and operation panel 108 after they are moved.

Next, as shown in FIGS. 11B and 11C, the frame 107 rotates downward to the original vertical position. In this state, the cover 105 shields the operation panel 108 so that the vehicle-mount audio apparatus cannot be seen from the outside and robbery can be prevented. In order to recover the use state of the vehicle-mount audio apparatus, the above operations are reversed.

In the above-described conventional robbery preventing apparatus for a vehicle-mount electric apparatus, many components such as the cover 105, operation panel 108 and frame 107 are required to move so that the drive mechanism for these components becomes complicated and the cost is raised. Furthermore, since the operation panel 108 having the cassette port 108a for mounting and dismounting a disk, a cassette tape or the like moves forward and backward relative to the electric apparatus. Therefore, the mechanism for mounting and dismounting a disk or the like is required to be devised. This makes the mechanism complicate and the cost high.

Some robbery preventing apparatuses have the operation panel which moves in unison with the apparatus main body. In this case, the above problems are solved. However, the drive mechanism is required to move the heavy main body together with the operation panel so that it becomes complicated and mechanical driving noises and consumption power become large.

In order to solve the above problems, a robbery preventing electric apparatus disclosed in Japanese Patent Laid-open Publication HEI 8-103935 and filed by the present applicant uses a novel drive mechanism for driving an operation panel. This drive mechanism moves a rotary shaft of the operation panel while the operation panel is rotated, so as to move the operation panel between first and second states, and sets the rotary shaft of the operation panel during the intermediate position in generally a horizontal state, to one end of the motion range. The first state sets the operation panel in such a manner that its normally used operation surface is directed to the front side, and the second state sets the operation panel in such a manner that its surface other than the normally used operation surface is directed to the front side.

With this robbery preventing apparatus for a vehicle-mount electric apparatus, only the operation panel is driven to prevent robbery and the mechanism can be simplified. However, as the operation panel is set generally in the horizontal state which allows a disk insertion, the rotary shaft of the operation panel protrudes forward by not a small degree. Therefore, the main body of the apparatus is required to be mounted at the deeper position of the apparatus. Since the disk port is formed in the main body, this port is located at the deeper position so that insertion and discharge of a disk become difficult.

SUMMARY OF THE INVENTION

The invention has been made in consideration of the above problems. It is an object of the present invention to provide a vehicle-mount electric apparatus capable of preventing robbery by only driving an operation panel, and facilitating insertion and discharge of a disk even if the operation panel is intermediately stopped while it is driven.

A vehicle-mount electric apparatus of this invention has an operation panel disposed on the front side of the apparatus and a drive mechanism for driving the operation panel in which the drive mechanism moves a rotary shaft of the operation panel while the operation panel is rotated. In this vehicle-mount electric apparatus, a drive mechanism chassis for supporting the operation panel drive mechanism is supported by a fixed chassis movably in the horizontal direction. A first lever is rotatively mounted on the drive mechanism chassis, and a second lever for rotatively supporting the rotary shaft is rotatively supported by the first lever. When the operation panel is positioned in generally a horizontal state during its motion, the rotary shaft is set to one end of the motion range of the rotary shaft, and this motion range is regulated by a vertical guide member mounted on the fixed chassis.

With this structure, as the rotary shaft of the operation panel is moved from the upper front to lower front of the electric apparatus by the rotation of 180 degrees, the operation panel can be turned upside down in front of the electric apparatus. In this state, the vehicle-mount electric apparatus is hidden with the operation panel and robbery can be prevented. Since the operation panel is light in weight and is driven in the above manner, the drive mechanism can be simplified.

Since the motion range of the rotary shaft of the operation panel is regulated by the vertical guide member mounted on the fixed chassis, the operation panel does not protrude forward during its motion and a disk inlet port of the main body can be positioned at the position nearer to the front side. Therefore, a disk can be easily loaded or discharged when the operation panel is stopped at the intermediate state.

In the vehicle-mount electric apparatus, means for detecting that the operation panel takes generally a horizontal state is mounted on the drive mechanism chassis, and means for detecting the first and second states of the operation panel is mounted on the fixed chassis. In this case, the output states of the two means can detects the first and second states and generally the horizontal state of the operation panel. Accordingly, the number of the detecting means can be reduced.

In the vehicle-mount electric apparatus, a roll for winding with a spring force a flexible cable for interconnecting the operation panel and a controller of the main body is rotatively mounted on the drive mechanism chassis. In this case, even if the length of the flexible cable changes as the operation panel moves, the cable can be prevented from being loosened.

DETAILED DESCRIPTION OF THE PREFERRED EMBODIMENTS

Figure 1:
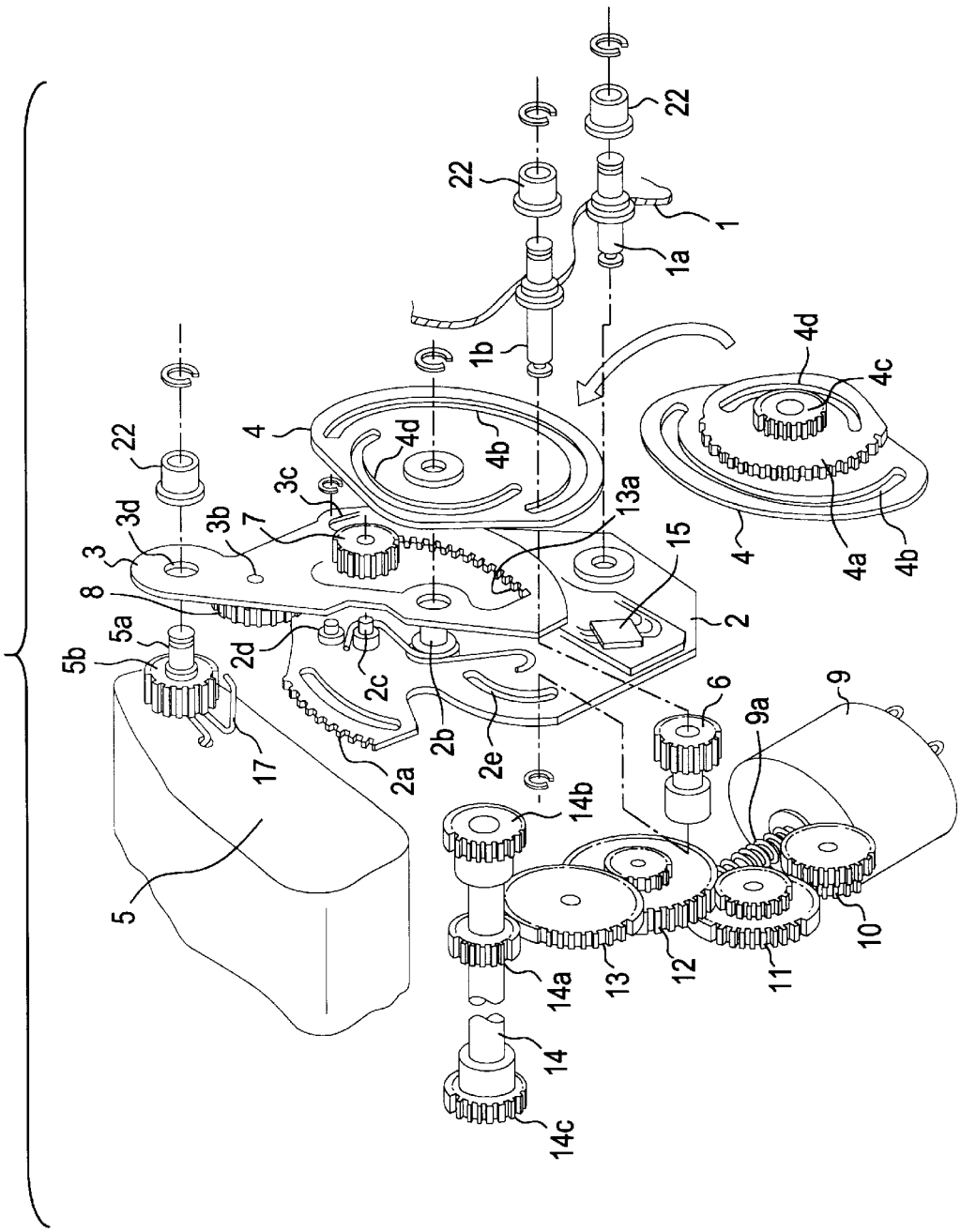
FIG. 1 is a broken perspective view showing the main part of a vehicle-mount audio apparatus according to an embodiment of the invention.

An embodiment of a vehicle-mount audio apparatus of this invention will be described with reference to the accompanying drawings. FIG. 1 is a broken perspective view showing the main part of the vehicle-mount audio apparatus according to an embodiment of the invention. In FIG. 1, reference numeral 1 represents a drive mechanism chassis for a vehicle-mount audio apparatus. This chassis 1 supports a drive mechanism for an operating panel 5 shown in FIGS. 1 to 7. The drive mechanism chassis 1 is supported movably in the horizontal direction a fixed chassis 20 shown in FIGS. 2 to 7. The fixed chassis 20 is mounted in an audio apparatus mount recess of the vehicle. In this specification, components fixed to the drive mechanism chassis 1 for supporting the drive mechanism are also called the drive mechanism chassis 1.

A shaft 1a mounted on the drive mechanism chassis 1 rotatively supports a first lever 2. Another shaft 1b mounted on the drive mechanism chassis 1 rotatively supports a third gear 6. The first lever 2 is formed with a guide groove 2e at its peripheral area concentrically with its rotary axis. This guide groove 2e engages with the shaft 1b to stabilize the rotation of the first lever 2. The drive mechanism chassis 1 rotatively supports a gear train coupling a motor 9 to the third gear 6.

A shaft 2b mounted on the first lever 2 rotatively supports a second lever 3 and a cam plate 4. A shaft 2d mounted on the first lever 2 engages with a guide groove 3c formed in the second lever 3 to stabilize the rotation of the second lever 3. A shaft 2c mounted on the first lever 2 rotatively supports a second gear 7. A sixth gear 2a is formed on the edge of the first lever 2 concentrically with the shaft 2b.

The second lever 3 rotatively supports the operation panel 5 by fitting a shaft 5a of the operation panel 5 into a hole 3d of the second lever 3. A fourth gear 5b is mounted on the operation panel 5 concentrically with the shift 5a. As shown also in FIG. 3, a fifth gear 8 rotatively supported by a shaft 3b mounted on the second lever 3 meshes with a fourth gear 5b and the sixth gear 2a. A torsion coil spring 17 hooked to the shaft 5a energizes the operation panel 5 to remove gear backlash.

An inner tooth gear 3a formed in the second lever 3 concentrically with the rotary axis thereof meshes with the second gear 7. The first lever 2 is energized in the counterclockwise direction as viewed in FIG. 3 by a torsion coil spring 18. Therefore, gear backlash can be eliminated. A micro switch 15 fixed to the first lever 2 faces the second lever 3 to detect the rotary position of the second lever 3.

The cam plate 4 turned upside down is shown also in FIG. 1. This cam plate 4 turned upside down is again turned upside down as shown by an arrow to be mounted on the apparatus. A first gear 4c and an arc guide groove 4d are formed in and on the cam plate 4 concentrically with its rotary axis. An ellipsoidal gear 4a and a cam groove 4b are also formed.

The cam groove 4b is formed along the outer circumference of the ellipsoidal gear 4a, with a distance between the elliptical gear 4a and the cam groove 4a being set constant in the radial direction relative to the rotary axis of the gear 4a.

Figure 3:
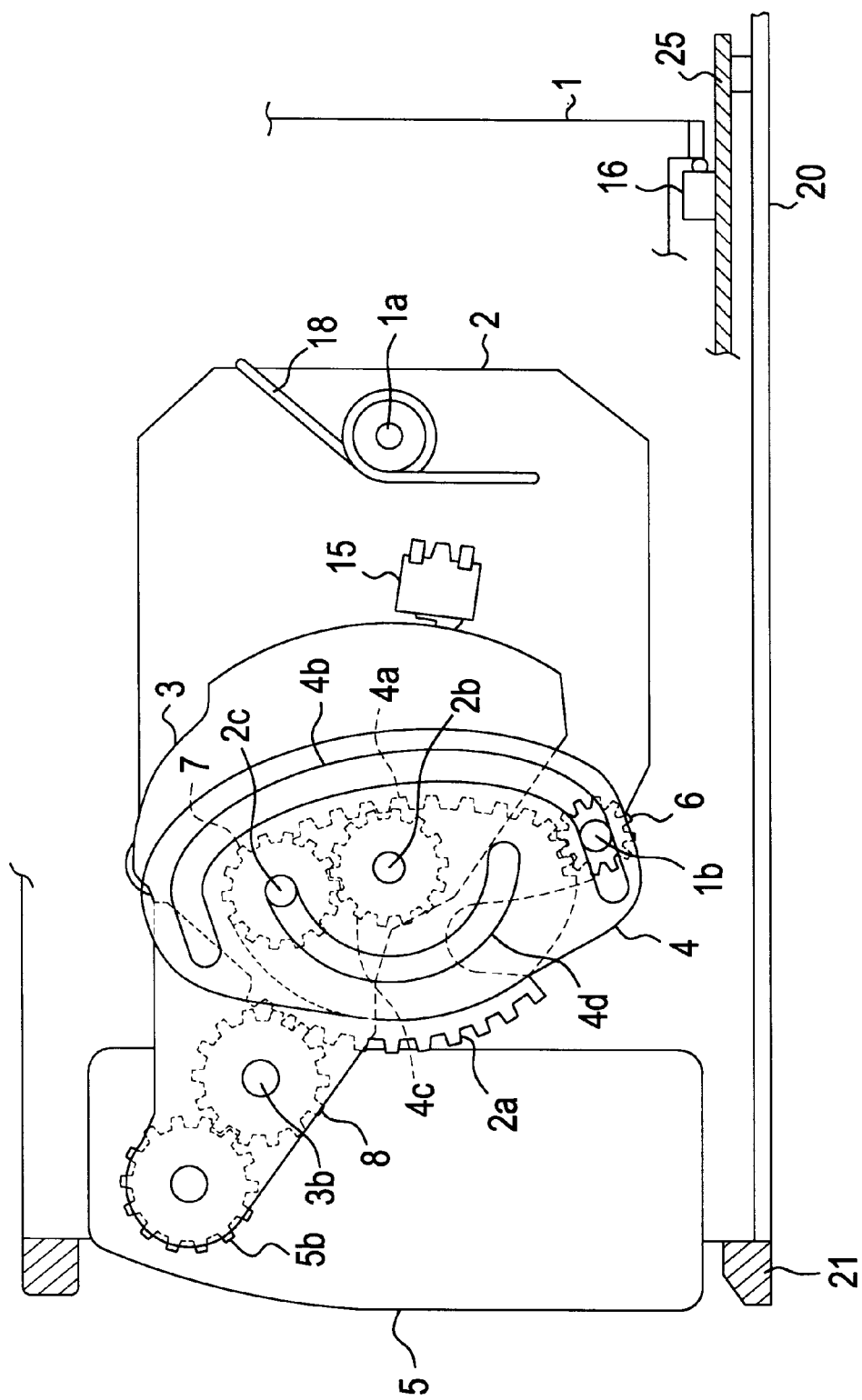

As also shown in FIG. 3, the guide groove 4d of the cam plate 4 engages with the shaft 2c to stabilize the rotation of the cam plate 4. The elliptical gear 4a of the cam plate 4 engages with the third gear 6, and the cam groove 4b engages with the shaft 1b. The first gear 4c formed on the cam plate 4 meshes with the second gear 7. As described earlier, the second gear 7 also meshes with the inner tooth gear 3a of the second lever 3. Namely, the tooth width of the second gear 7 is made wider than the total tooth width of the first gear 4c and inner tooth gear 3a.

Figure 2:
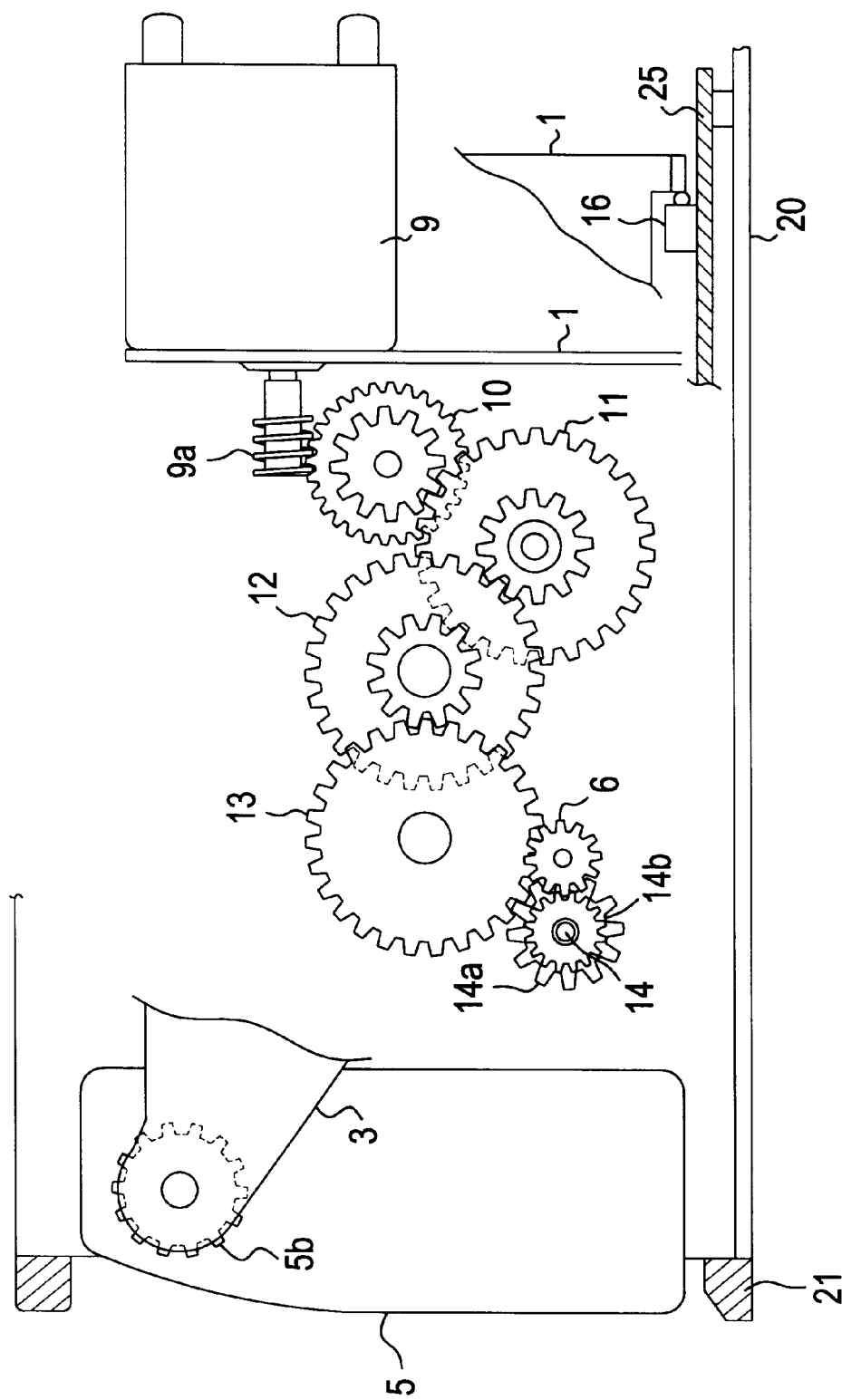
FIGS. 2 to 4 are side views showing the operation of the drive mechanism in the main part of the vehicle-mount audio apparatus.

The gear train coupling the motor 9 to the third gear 6 is also shown in FIG. 2. A worm gear 9a fixed to the rotary shaft of the motor 9 meshes with a helical gear of a two-stage gear 10. A small gear of the two-stage gear 10 meshes with a large gear of a two-stage gear 11. A small gear of the two-stage gear 11 meshes with a large gear of the two-stage gear 12. A small gear of the two-stage gear 12 meshes with a gear 13.

This gear 13 meshes with another gear 14a which is fixed to a shaft 14 rotatively supported by the drive mechanism chassis 1 at opposite ends. Gears 14b and 14c are fixedly mounted on opposite ends of the shaft 14. The gear 14b meshes with the third gear 6. As described previously, the third gear 6 also meshes with the elliptical gear 4a. Namely, the tooth width of the third gear 6 is made wider than the total tooth width of the gear 14b and ellipsoidal gear 4a.

Figure 7:
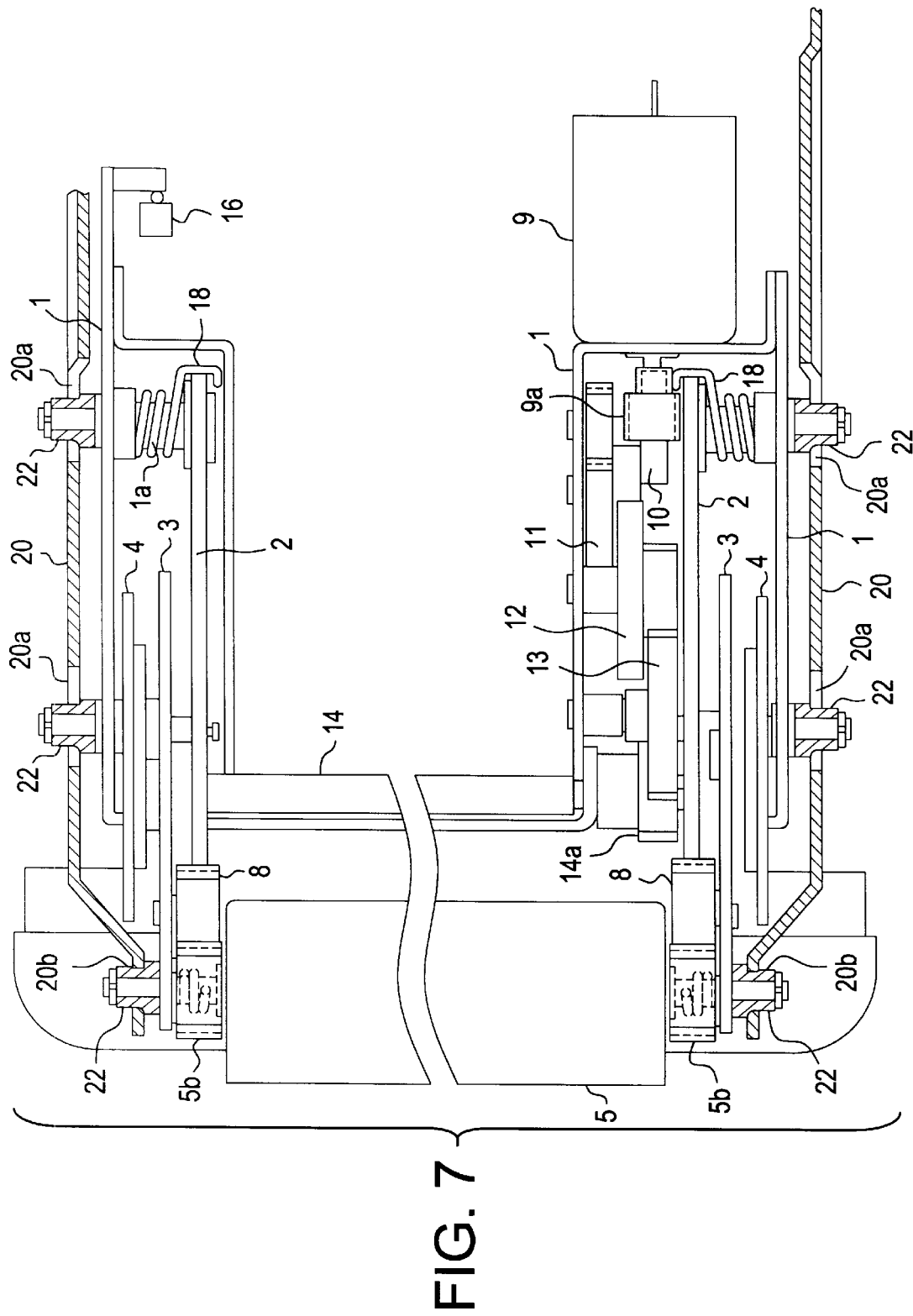
FIG. 7 is a plan view showing the main part of the vehicle-mount audio apparatus.

The gear 14c fixed to the shaft 14 drives the operation panel drive mechanism partially disposed on the drive mechanism chassis 1 on the side opposite to the motor 9. Namely, as shown in FIG. 7, components such as the first lever 2 are disposed symmetrically on both sides of the drive mechanism chassis 1, and the gear 14c meshes with the third gear disposed on the drive mechanism chassis 1 on the side opposite to the motor 9.

As shown in FIG. 1, rollers 22 and 22 are mounted on the shafts 1a and 1b mounted on the drive mechanism chassis 1. A roller 22 is also mounted on the shaft 5a of the operation panel 5. Although only the right portion of the drive mechanism chassis 1 is shown in FIG. 1, similar rollers 22, 22, . . . are also mounted on the left portion of the chassis 1.

Figure 4:
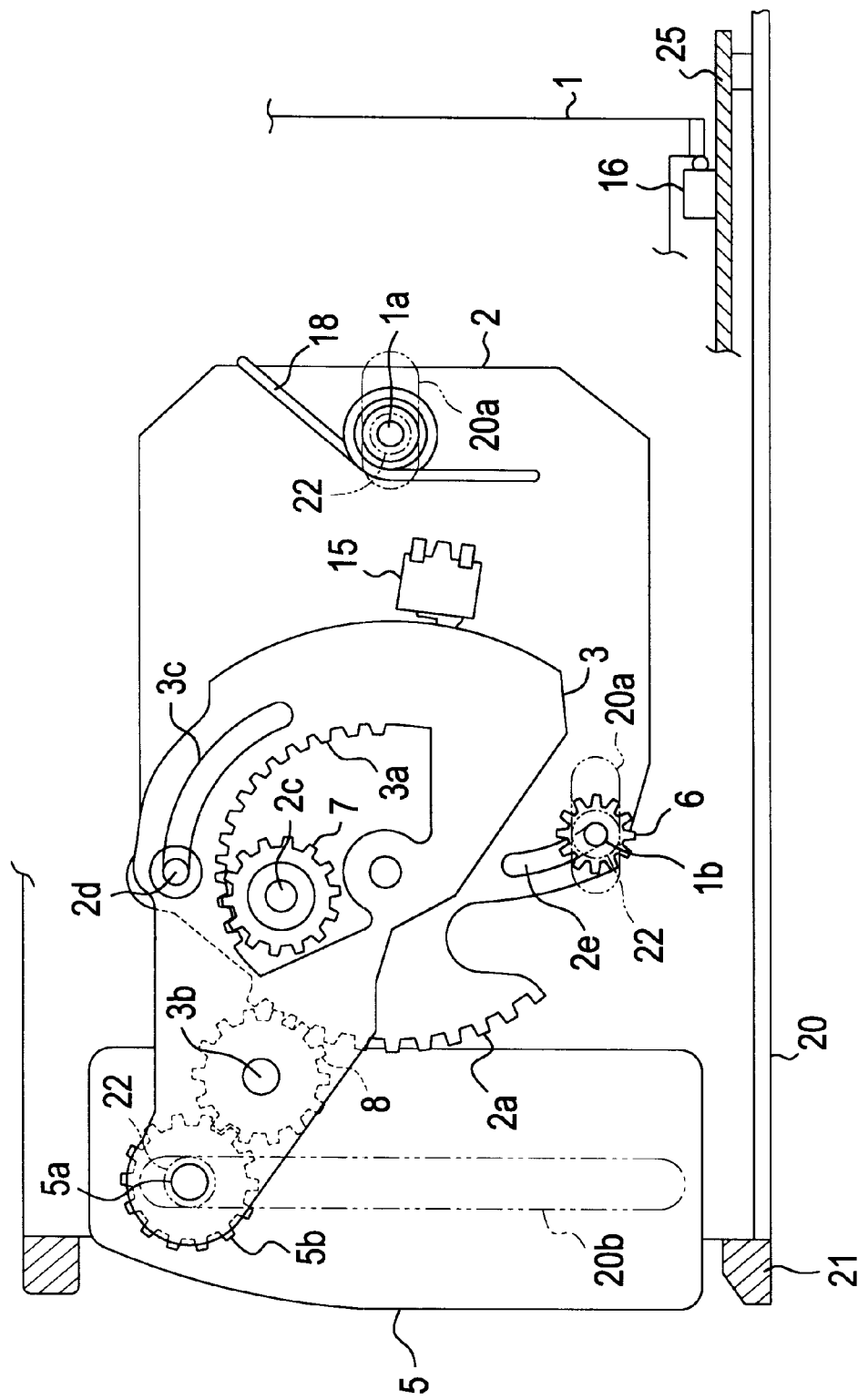
Figure 5:
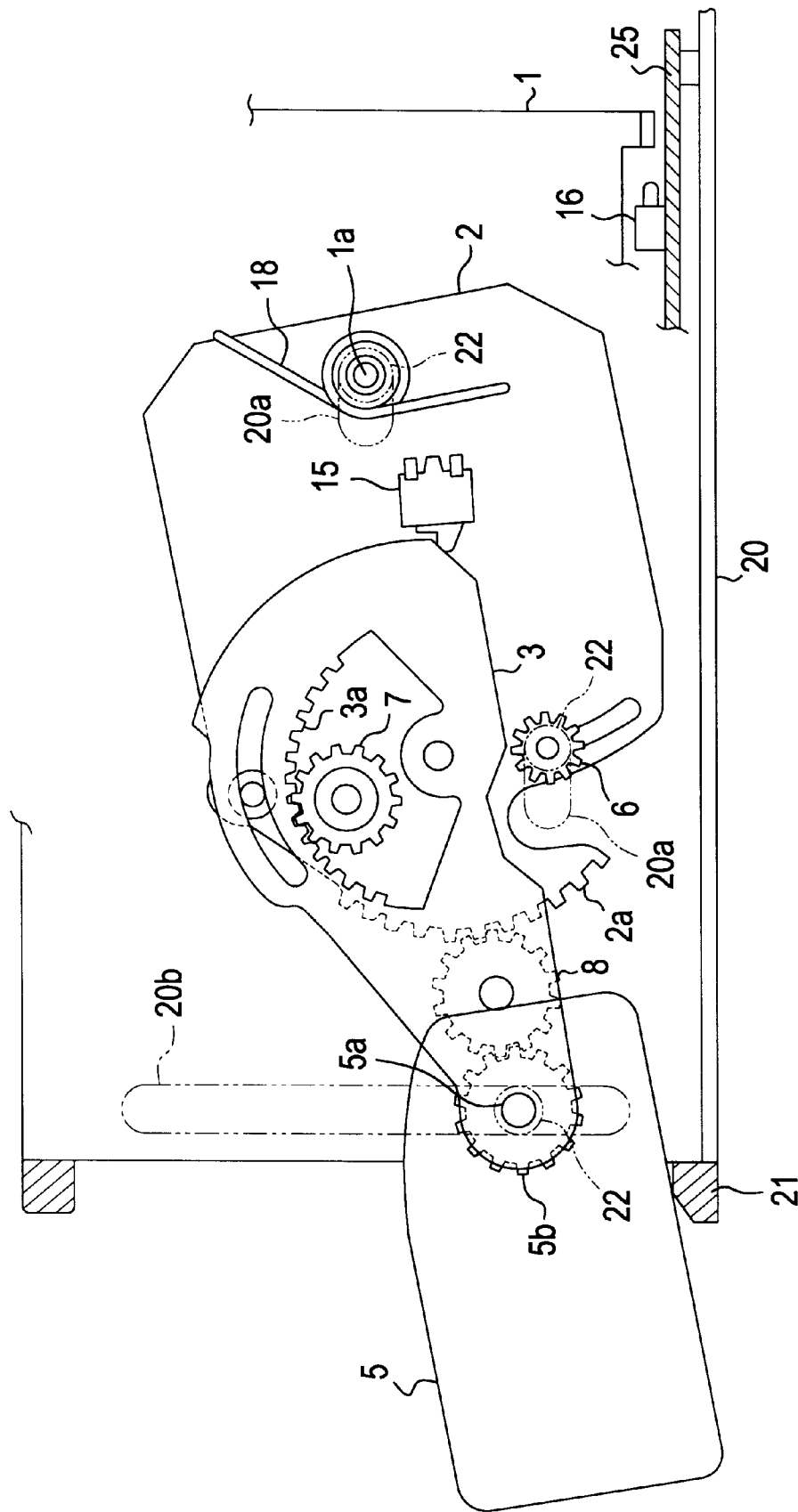
FIGS. 5 and 6 are side views illustrating the operation of the vehicle-mount audio apparatus.
Figure 6:
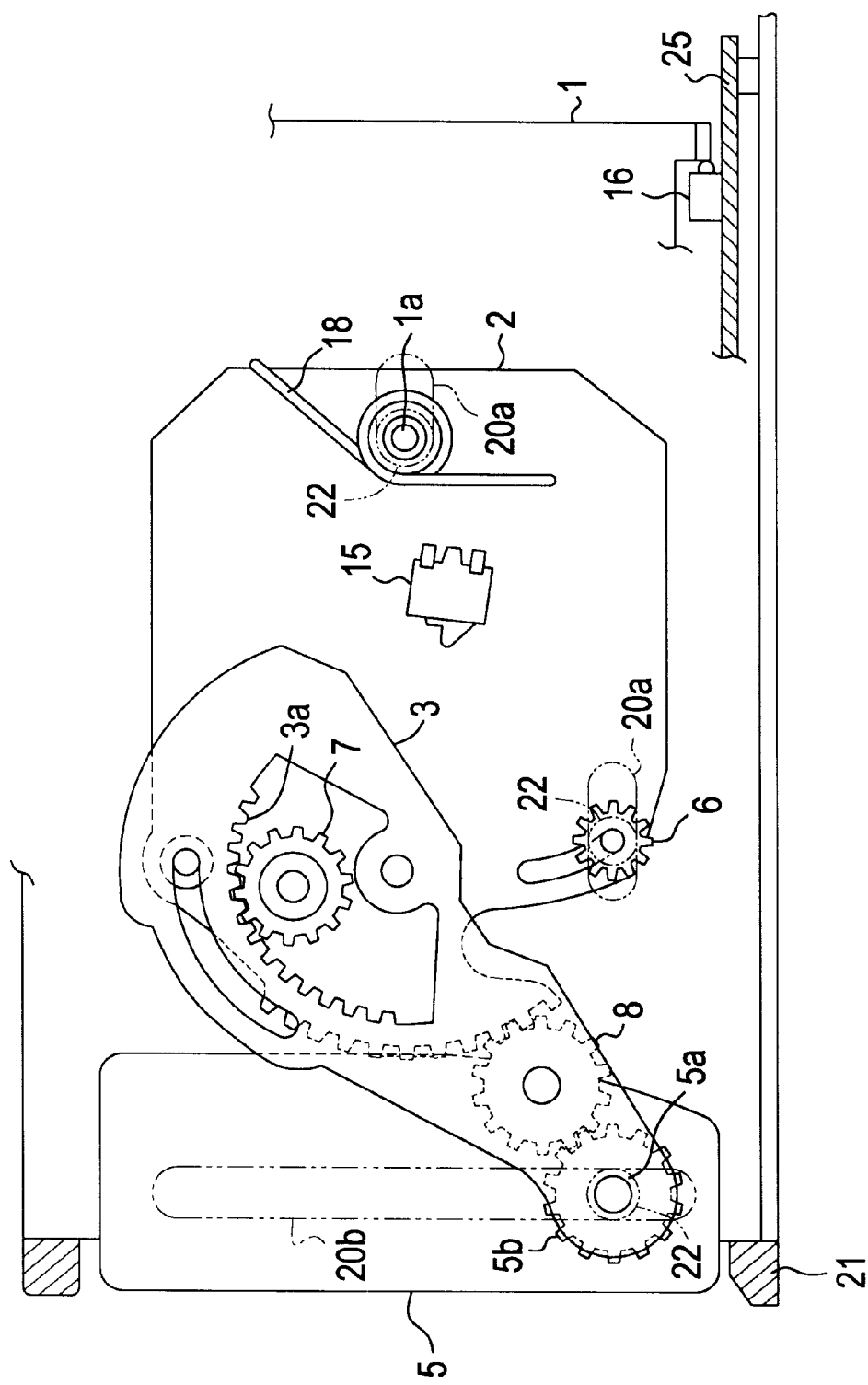

As shown in FIGS. 4 to 6, the rollers 22 and 22 of the shafts 1a and 1b are inserted into horizontal guide grooves 20a and 20a of the fixed chassis 20, and the rollers 22 of the shaft 5a are inserted into vertical guide grooves 20b. Namely, the drive mechanism chassis 1 is supported by the horizontal guide grooves 20a and 20a and moves in the horizontal direction in accordance with the position of the rotary shaft 5a of the operation panel 1. A micro switch 16 for detecting the position of the drive mechanism 1 is mounted on a printed circuit board 25 fixedly mounted on the fixed chassis 20. An escutcheon 21 is fixed in front of the fixed chassis 20.

Figure 8:
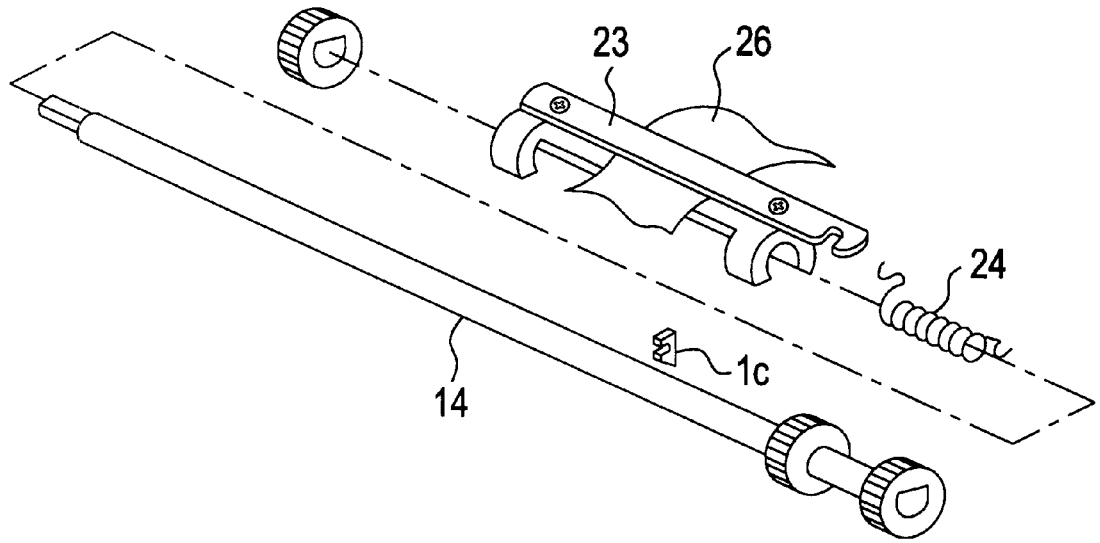
FIG. 8 is a perspective view showing the main part of the vehicle-mount audio apparatus.

A flexible cable 26 shown in FIG. 8 interconnects the printed circuit board 25 and operation panel 5, and extends between a space around a winding roller 23 fitted to the shaft 14. A torsion coil spring 24 extending between the winding roller 23 and a spring hook 1c mounted on the drive mechanism chassis 1 energizes the winding roller 23 in the clockwise direction as viewed from the lower right in FIG. 8.

Next, the operation of the drive mechanism for the operation panel constructed as above will be described. FIGS. 2 to 4 show a normal use state of the vehicle-mount audio apparatus. In this state, the operation surface of the operation panel is positioned in front of the audio apparatus. Upon activation of an unrepresented key, the operation panel 5 changes its state from that shown in FIG. 4, to that shown in FIG. 5, and to that shown in FIG. 6.

The operation panel 5 may be stopped at the position shown in FIG. 5 depending upon the activation of the key. Each state shown in FIGS. 4 to 6 is detected with the micro switches 15 and 16. The state shown in FIG. 4 is detected by the on-state of the micro switch 15 and the on-switch of the micro switch 16. The state shown in FIG. 5 is detected the on-state of the micro switch 15 and the off-switch of the micro switch 16. The state shown in FIG. 6 is detected the off-state of the micro switch 15 and the on-switch of the micro switch 16. In the above manner, the three states of the operation panel can be detected by the two micro switches.

In the state shown in FIG. 5, the operation panel 5 is generally horizontal. In this state, the shaft 5a is positioned low so that the front of the vehicle-mount audio apparatus is opened large and a recording medium such as a cassette tape can be loaded via a recording medium inlet port positioned at the back of the operation panel 5. The shaft 5a of the operation panel 5 is guided by the vertical guide groove 20b and does not move in the horizontal direction. Therefore, the inlet port formed in the fixed chassis 20 can be positioned in the front area near the operation panel 5 and insertion and discharge of the recording medium become easy. It is also possible to reduce the depth of the audio apparatus. In the state shown in FIG. 6, the back surface of the operation panel 5 is directed to the front side and the audio apparatus is hidden so that even the driver moves away from the vehicle, robbery can be prevented.

The motion of the operation panel 5 will be described. In the state shown in FIG. 3, as the third gear 6 is driven in the counter-clockwise direction, the cam plate 4 rotates in the clockwise direction. Then, the first gear 4c, second gear 7 and inner tooth gear 3a all meshing with each other make the second lever 3 rotate in the counter-clockwise direction. The first lever 2 is guided by the shaft 1b and cam groove 4b and temporarily rotates in the counter-clockwise direction and then in the clockwise direction.

While the operation panel 5 changes from the position shown in FIG. 4 to the position shown in FIG. 5, both the first and second levers 2 and 3 rotate in the counter-clockwise direction and the shaft 5a is moved to the lowest limit position. At this time, the shaft 5a relatively moves in the direction opposite to the shaft 1a (rotation center of the first lever) mounted on the drive mechanism chassis 1. However, since the shaft 5a is not allowed to move in the horizontal direction relative to the fixed chassis 20, the drive mechanism chassis 1 moves backward.

While the operation panel 5 changes from the position shown in FIG. 5 to the position shown in FIG. 6, the first lever 2 rotates in the clockwise direction and the second lever 3 rotates in the counter-clockwise direction and stops generally at the lower limit position. At this time, although the shaft 5a relatively moves in the direction toward the shaft 1a (rotation center of the first lever 2) mounted on the drive mechanism chassis 1, the shaft 5a is not allowed to move in the horizontal direction relative to the fixed chassis 20 so that the drive mechanism chassis 1 moves forward.

While the operation panel 5 changes from the state shown in FIG. 4 to the state shown in FIG. 6, the operation panel 5 is moved in the clockwise direction by 180 degrees by the fourth, fifth and sixth gears 5b, 8 and 2a meshed with each other. By rotating the motor 9 in the reverse direction, the operation panel 5 moves from the position shown in FIG. 6 to the position shown in FIG. 5 and to the position shown in FIG. 4, in the reverse manner described above.

The motion path of the operation panel 5 can be optimized by adjusting the distance of the shaft 2b from the rotation center of the first lever 2, a distance between the rotation center of the second lever 3 and the hole 3d, the shapes of the ellipsoidal gear 4a and cam groove 4b, and the peripheral tooth diameters of the first gear 4c, second gear 7, inner tooth gear 3a, sixth gear 2a, fifth gear 8 and fourth gear 5b.

Figure 9A:
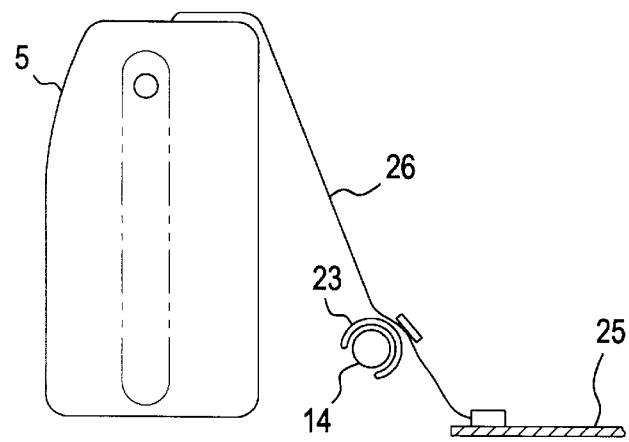
FIGS. 9A to 9C are side views illustrating the operation of the vehicle-mount audio apparatus.
Figure 9B:
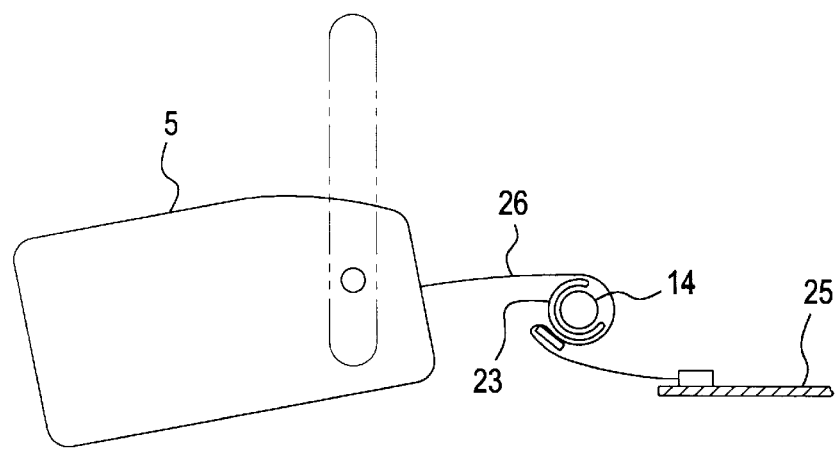
Figure 9C:
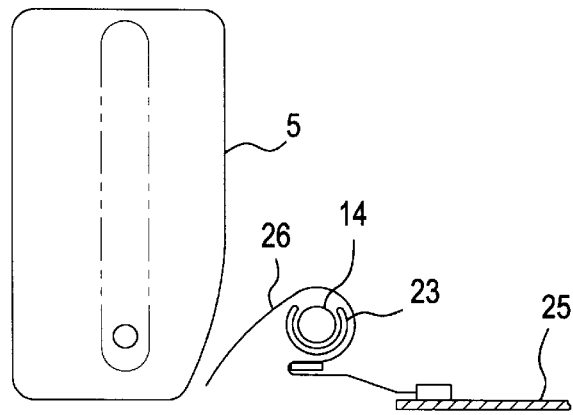
Figure 10A:
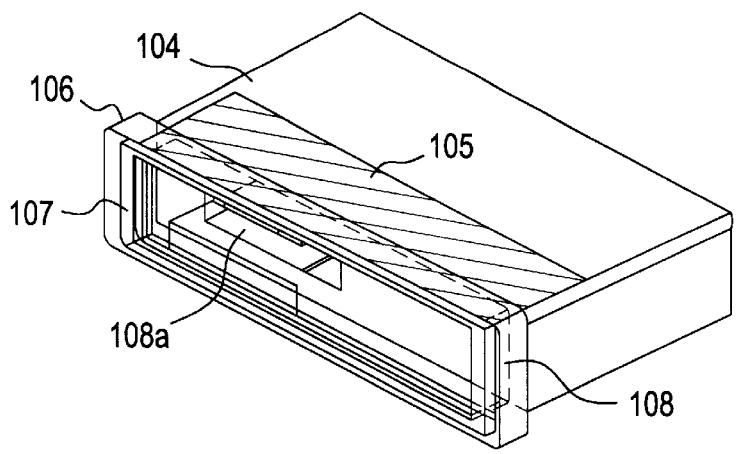
FIGS. 10A to 10C are perspective views illustrating operation states of a conventional robbery preventing apparatus for a vehicle-mount audio apparatus.
Figure 10B:
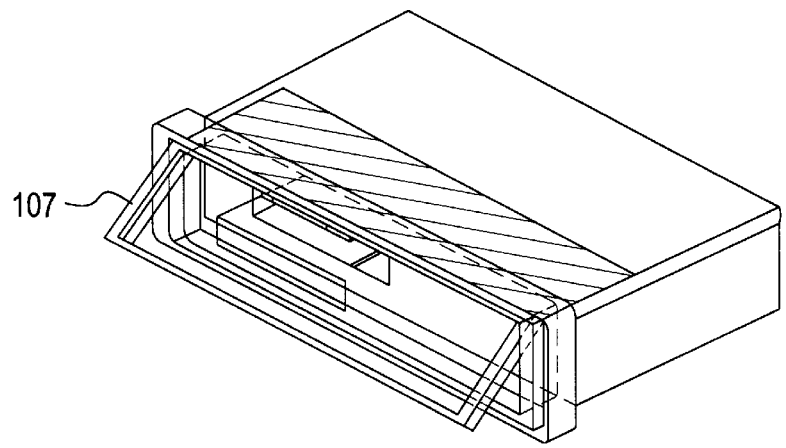
Figure 10C:
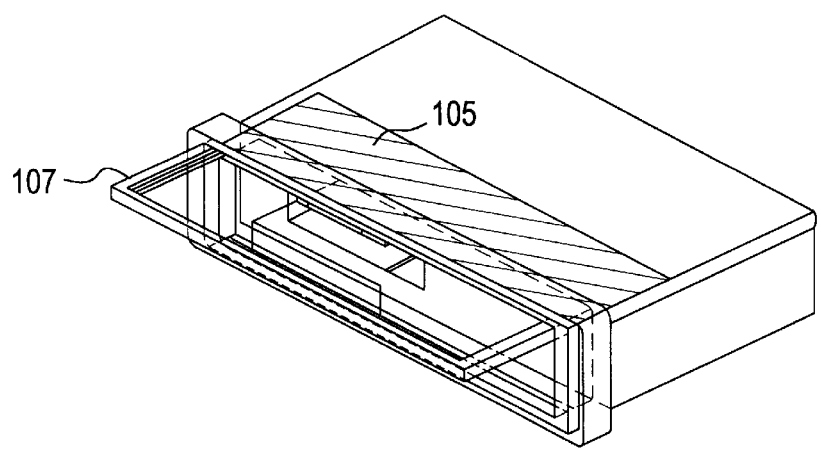
Figure 11A:
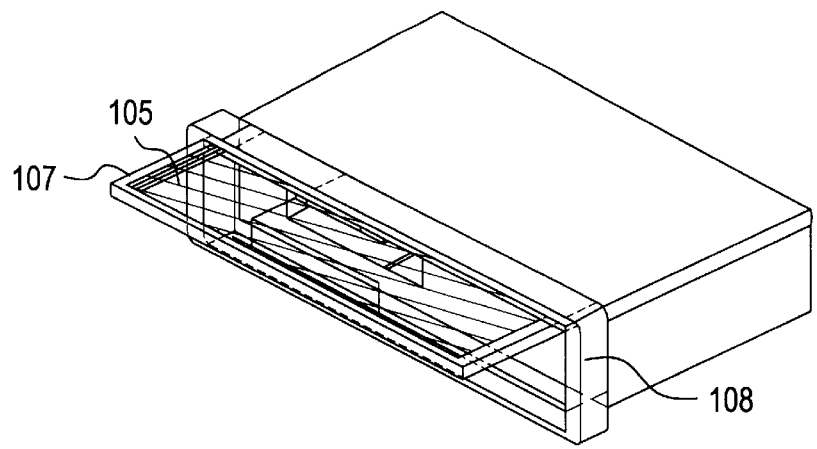
FIGS. 11A to 11C are perspective views illustrating other operation states of the conventional robbery preventing apparatus for a vehicle-mount audio apparatus.
Figure 11B:
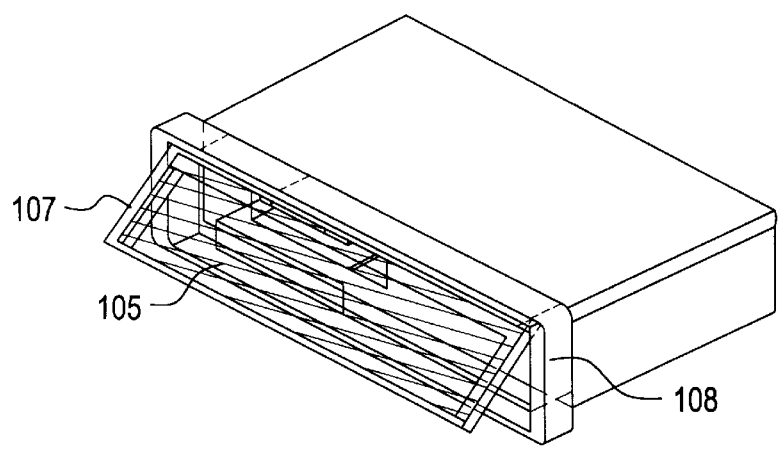
Figure 11C:
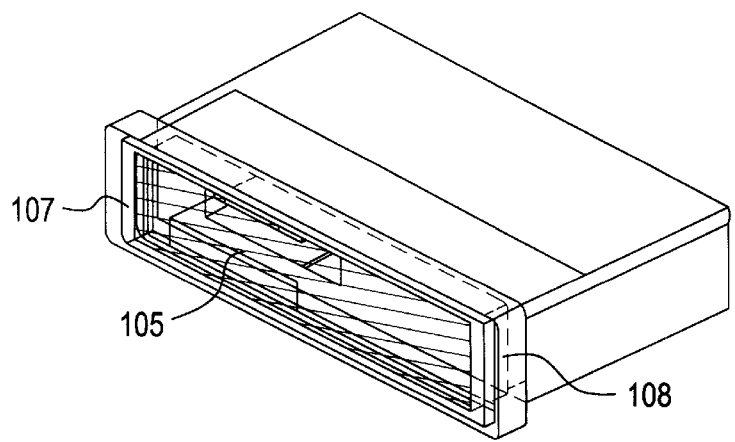

As the operation panel 5 moves, the length of the flexible cable 26 interconnecting the operation panel 5 and printed circuit board 25 changes. However, since the flexible cable is inserted through a gap around the winding roller 23 energized in the clockwise direction as described with FIG. 8, the flexible cable 26 is not loosened and does not interfere with other moving components. FIGS. 9A to 9C illustrate the states of the flexible cable 26 in the corresponding states of the operation panel 5 shown in FIGS. 4 to 6.

In the above embodiment, the rear surface of the operation panel is used for hiding the audio apparatus in order to prevent robbery. This rear surface may be used in an operation mode different from that used for the front surface.

According to the vehicle-mount electric apparatus of this invention, when a driver moves away from the vehicle, the rear surface of the operation panel is used for hiding the electric apparatus to prevent robbery. Since components to be driven are only the light-weight operation panel, the drive mechanism can be simplified. An additional shielding panel is not necessary so that the total cost can be reduced.

Furthermore, when the operation panel is stopped in generally the horizontal state, the front of the electric apparatus is opened large so that even a thick recording medium such as a cassette tape can be easily loaded. A recording medium is loaded directly via a disk inlet port of the electric apparatus without being intervened by the operation panel. In this case, since the disk inlet port is located at the front area near the operation panel, it is easy to mount or dismount a disk. The depth of the audio apparatus can be reduced.

What is claimed:

1. Electric apparatus comprising:
   - a panel having a front surface of which is provided with manual operation means and/or display means, having a rotation axis at one upper or lower end of the panel;
   - mechanism means for shifting the rotation axis of said panel along a substantially linear line in a vertical direction to rotate said panel reversibly between the front panel surface and a rear panel surface; and
   - a main body mounting said mechanism means.

2. Electric apparatus according to claim 1 wherein said mechanism means includes a vertical direction slot provided on said main body, the rotation axis of said panel being engaged with the slot and shifted along the slot.

3. Electric apparatus according to claim 2 wherein said mechanism includes lever means one end of which is engaged with the rotation axis of said panel and the other end is engaged with a lever rotation axis, the rotation axis of said panel being shifted by rotating said lever means about the lever rotation axis.

4. Electric apparatus according to claim 3 wherein the lever rotation axis is laterally shifted when the rotation axis of said panel is vertically shifted in engagement with the slot by the rotation movement of said lever means.

5. Electric apparatus according to claim 1 further comprising:
   - electric circuit means stationarily mounted to the main body;
   - cable means for electrically connecting said electric circuit means to a connecting point of said panel; and
   - means for adjusting the length of said cable means as the distance between said electric circuit means and the connecting point of said panel changes according to the panel movement for reversing the surface of said panel.

6. Electric apparatus comprising,
   - a panel movably mounted to a main body of the apparatus, the panel being provided with manual operation means and/or display means;
   - electric circuit means stationary mounted to the main body;
   - cable means for electrically connecting said electric circuit means to a connecting point of said panel; and
   - means for adjusting the length of said cable means as the distance between said electric circuit means and the connecting point of panel changes according to the panel movement.

7. Electric apparatus according to claim 6 wherein, said adjusting means includes means for applying a predetermined tension to said cable means.

8. Electric apparatus according to claim 6 wherein, said adjusting means includes means for winding said cable means up.

9. Electric apparatus according to claim 6 wherein, said winding-up means is positioned at the midpoint of said cable means and winds up simultaneously opposite end parts of said cable means of the midpoint.

10. Electric apparatus comprising,
    - a panel movably mounted to a main body of the apparatus to be rotatably reversed between a front panel surface and a rear panel surface, the front panel surface being provided with manual operation means and/or display means;
    - electric circuit means stationary mounted to the main body;
    - cable means for electrically connecting said electric circuit means to a connecting point of said panel; and
    - means for adjusting the length of said cable means as the distance between said electric circuit means and the connecting point of said panel changes according to the panel movement for reversing the surface of said panel.

* * * * *